T. U. & H. H. HAMILTON.
Traction Engine.

No. 92,607.  Patented July 13, 1869.

United States Patent Office.

THOMAS U. HAMILTON AND HENDRICK H. HAMILTON, OF PANAMA, NEW YORK.

Letters Patent No. 92,607, dated July 13, 1869.

DEVICE FOR PROPELLING CARRIAGES.

The Schedule referred to in these Letters Patent and making part of the same.

*To all whom it may concern:*

Be it known that we, THOMAS U. HAMILTON and HENDRICK H. HAMILTON, of Panama, in the county of Chautauqua, and in the State of New York, have invented certain new and useful Improvements in Vehicles; and do hereby declare that the following is a full, clear, and exact description thereof, reference being had to the accompanying drawings, and to the letters of reference marked thereon, making a part of this specification.

The nature of our invention consists in the application of springs and wheels to an ordinary vehicle, in such a manner as to propel them along, as will hereafter be fully set forth and described.

Figure 1:
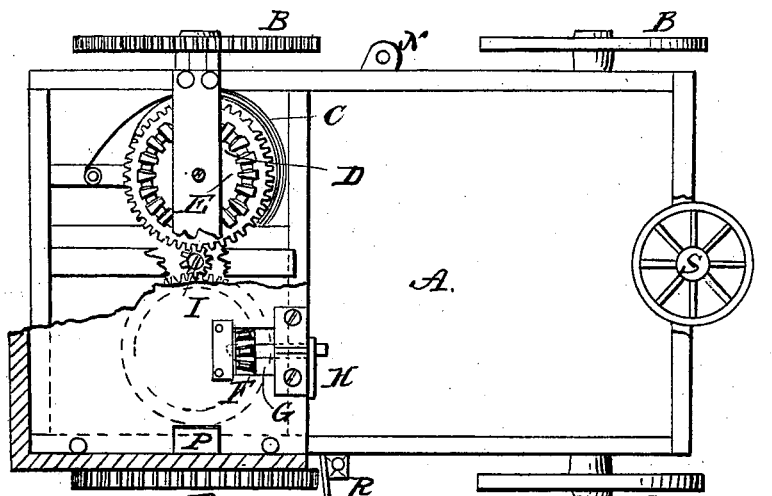
Figure 1 is a plan view of our vehicle.
Figure 2:
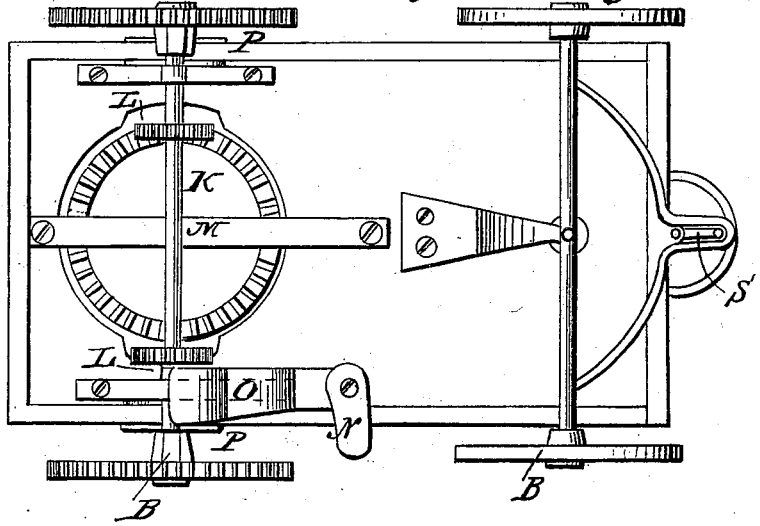
Figure 2 is a bottom view of the same.

Letter A represents the body of the wagon, which rests upon four wheels, B, three of which are secured loosely to the axles.

In the back part of the body, under the seat, there are placed two springs, C, connected to which there is a cog-wheel, D, provided with a pawl and ratchet, and a bevelled-cog wheel, E.

Connected with the wheel E, there is a small cog, F, which is secured to the shaft G, the bearings of which rest upon the seat.

To the end of these shafts, the crank is applied for the purpose of winding up the springs.

Attached to the front of the seat there are two dogs, H, one for each one of the shafts G, which are intended to hold them, while the machine is being wound up, by running down-hill.

Midway between the two springs there is a small cog-wheel, I, placed, which gears in the two wheels D, so as to combine the power of both springs either in propelling the vehicle forward or back, and which transmits the power to the rear ribbed driving-wheel.

Placed in a bed in the bottom of the wagon-body, is the large wheel K, which has a cogged rim on its under side.

This wheel receives its motion from the shaft of the wheel I, and, in revolving, communicates the motion to one of the wheels L, placed on the axle M.

This axle is made to slide from one side of the body to the other, so that only one of the wheels L should gear with the large one, K, at a time.

Secured to the side of the wagon is the lever N, which is secured to the plate or rod O, by means of a short arm, and which is made to press against the side of one of the wheels L, and against a collar formed on the axle, so that the wheels can be thrown in and out of gear at will.

After the wheels have been thrown in gear, in order to prevent them from being thrown out again, there has been a flat slide, P, placed, which consists of a flat metal plate, extending down the side of the body, and which catches inside of the collar formed on the ends of the axles M, and thus prevents the axle from being shifted.

The slides are placed in a convenient place in the sides of the seat, and can be raised and depressed at will.

The lever N can be moved in such a position as to make both of the wheels L gear with K at once, thus completely locking the driving-wheel.

These springs in body are so arranged, that one of them propels the wagon forward, while the other reverses the motion.

While going forward, the motion can be checked either by the brake R, or by the lever N causing the wheels to lock.

As soon as it is desired to move in the opposite direction, the wheels L are shifted, thus causing the power to be exerted by the other spring, whereby the vehicle is moved backward.

Upon the front end of the machine there is placed a guiding-lever, S, the upper end of which is connected to a wheel, so that it can be the more easily managed.

This lever is joined to the front axle by the means of arms, so that the vehicle can be steered in any direction.

Having thus described our invention,

What we claim, and desire to secure by Letters Patent, is—

1. Springs C, cog-wheel D, provided with pawl and ratchet, bevelled gear E, in combination with the pinion F and dog H, when all are used substantially in the manner and for the purpose set forth.

2. The cog-wheel I, when used to connect the two springs, and to impart motion to the wheel K, substantially as set forth.

3. The wheels K and L, in combination with the shifting-axle M and slides P, when used substantially as described.

4. The lever N, whose arm or rod O is used to throw the wheels L in and out of gear, for the purpose of reversing the motion, substantially as described.

5. The slides P, when used to hold the wheels L in gear, substantially as specified.

6. The springs C, wheels D, E, F, K, and L, slides P, lever N, and rod O, and cog-wheel I, when arranged and combined so as to form a mechanism for propelling vehicles, substantially as set forth.

In testimony that we claim the foregoing, we have hereunto set our hands and seals, this 19th day of April, 1869.

THOMAS U. HAMILTON. [L. S.]
HENDRICK H. HAMILTON. [L. S.]

Witnesses:
JAS. PEASE,
M. J. PEASE.